Patented Mar. 25, 1930

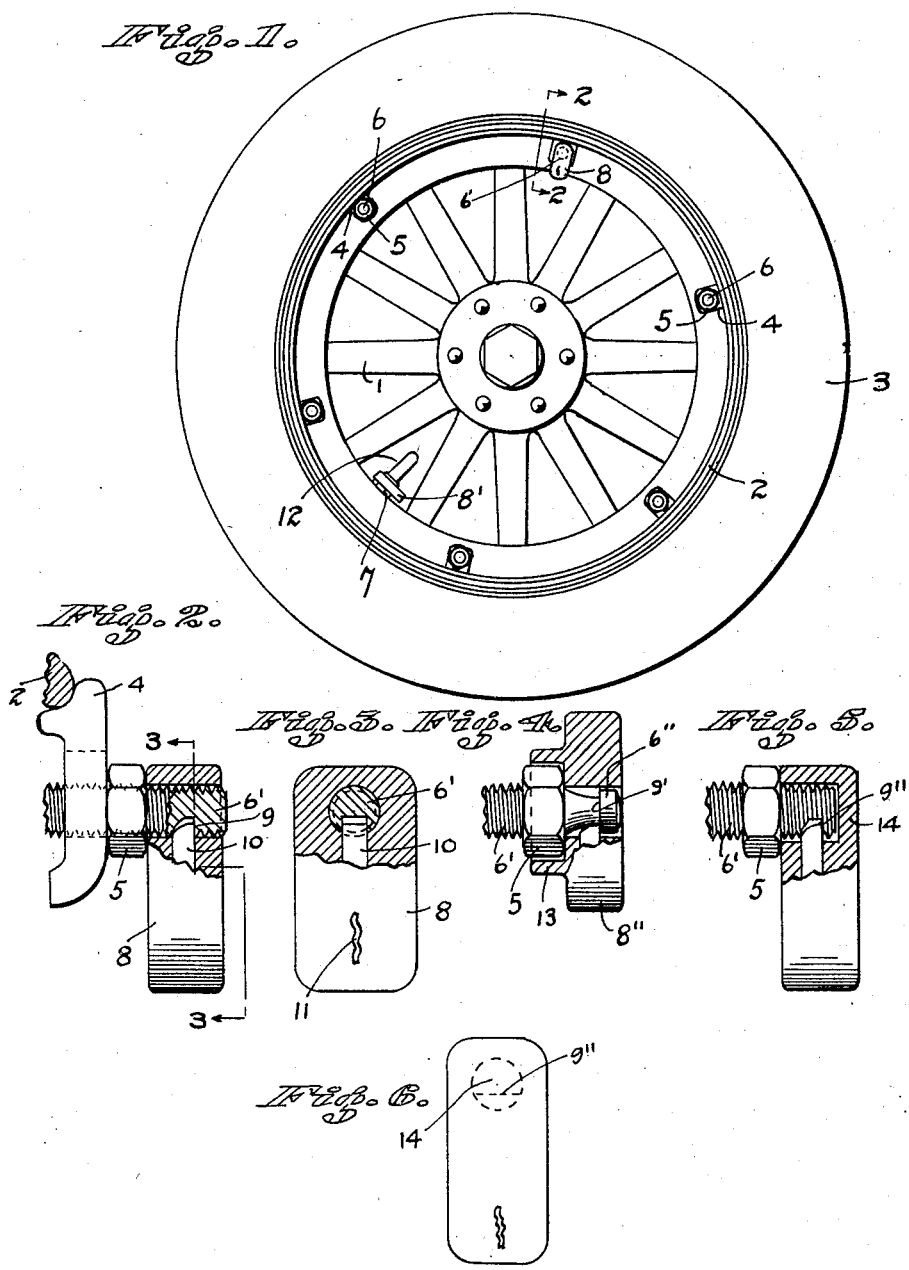

1,751,779

UNITED STATES PATENT OFFICE

BOYD V. von SENDEN, OF SAN FRANCISCO, CALIFORNIA, ASSIGNOR OF ONE-THIRD TO THEODORE HARDEE AND ONE-THIRD TO GUY N. BJORGE

WHEEL-RIM LOCK

Application filed January 10, 1927. Serial No. 160,048.

This invention relates to automobile wheels and has to do with means for locking the rims in place. The object of the invention is to provide means which will prevent the unauthorized removal of the tire rim or its holding lugs so as to thereby prevent theft of the tires which has heretofore been accomplished by simply jacking up the car and taking off the tires on their removable rims, or its equivalent a removable wheel in some cases.

The drawings accompanying this application show the preferred form of the invention, Fig. 1 being an elevation of a common type of automobile wheel with my lock in place on one of the tire rim bolts, Fig. 2 an enlarged broken side view of the end of the bolt taken from the line 2—2 of Fig. 1, Fig. 3 a view of Fig. 2 from the line 3—3 thereof, Fig. 4 showing a slight modification in the end of the bolt, and Figs. 5 and 6 side and end views respectively of a slight modification in the lock and bolt end.

Briefly described my invention comprises providing one or more of the common rim bolts of somewhat greater length and of engaging the projecting end above the common nut with a specially devised lock, and it also consists in the particular relation of the locked bolt to the air stem inlet of the tire as will be hereinafter described.

In the drawings 1 is a common automobile wheel provided with a removable rim or strip 2 and a tire 3. The removable strip or rim 2 being held in place by a plurality of rim lugs 4 clamped against the same by nuts 5 on the rim bolts 6.

The tire is provided with the usual air valve inlet stem projecting through the rim tightened against the felly by a nut 7 and covered by a dust cap 12, all the above described parts being of the well known construction.

At a point preferably diametrically opposite the valve stem one of the bolts as at 6' is made longer than the others and is engaged at its outer end by a special lock 8 in the manner as shown in any of the Figures 2, 4 and 5.

In Fig. 2 the bolt 6' has a latch seat formed in its side at 9 and the lock is provided with a snap latch bolt as at 10 beveled off as shown so that the lock may be simply pressed over the end of the bolt and the latch bolt will snap in place in the seat, and when thus in place over the end of the bolt the lock prevents removal of the rim releasing nut 5. To remove the lock a key is inserted in the keyhole 11 and the bolt withdrawn, the lock 8 being provided with any of the well known lock mechanisms for effecting release of the bolt with the key not specifically a part of this invention and therefore not shown.

A similar lock may be positioned over the valve stem as shown at 8' at a point between its nut 7 and dust cap 12.

The lock and end of the bolt may be varied considerably while still functioning in the manner described. Fig. 4 shows one such modification in which the lock 8'' is of circular form and is provided with a circular flange 13 covering the nut 5 so that it cannot be reached with a wrench and the bolt notch 9' is a circular groove so that the lock may be revolved on the bolt when locked while the bolt 6' is provided with a reduced end as at 6'' over which the lock slips.

Figs. 5 and 6 show a still further modification which may be applied to any of the locks and which consists of providing the lock with a web 14 covering the end of the bolt 6' so that moisture and dust will not easily find entrance and which also prevents the forcing in of any small instrument in an attempt to release the latch bolt. In this modification the notch in the bolt is cut straight across as shown at 9'' in Fig. 6.

It is of course evident that several of these locking devices may be used on each wheel if desired, but through my method of use shown in Fig. 1 a single lock cooperates with the valve stem 12 of the tire to prevent removal whether or not the stem is provided with a lock, but if the lock 8 shown in the figure were not placed at a point remote from the valve stem it is conceivable that upon release of the unlocked bolts the rim could be pulled outwardly and forced downwardly from under the locked bolt, but with the arrangement shown this is impossible, though attention is called to the fact that the locked bolt need not be directly opposite the valve stem in order to so cooperate with it in locking on the rim.

It should also be noted that while I show a wheel with the usual arrangement of rim lugs with one locked by my device, it is manifest that the invention applies to all of the various types of automobile wheels in which a device is secured with a bolt of even where the major part of the wheel itself is so removably secured in place, and all of these arrangements are intended to be included in my claims by the terms chosen to express the representative construction shown.

I claim:

1. A key operated lock formed to slip over the outer end of a bolt, a nut on said bolt inward of the lock, said lock provided with means engaging the threaded bolt against withdrawal of the lock, said means comprising a spring latch adapted to snap into engagement with a groove in said bolt upon the lock being axially slid over the same, and a circular flange on said lock arranged to freely embrace said nut.

2. In combination with a threaded bolt having a nut thereon, a circumferential groove on the outer end of said bolt outward of the nut, means for preventing the removal of said nut comprising a key-operated lock having a latch, said latch being arranged to enter into said groove upon the lock being axially slid over the end of the bolt, said lock being freely revolvable around said bolt in front of said nut while engaged in said groove.

BOYD V. von SENDEN.